Aug. 2, 1938.  E. J. W. RAGSDALE ET AL  2,125,691

SHEET METAL BEAM

Original Filed Nov. 22, 1933   2 Sheets-Sheet 1

INVENTORS
EARL J.W. RAGSDALE &
ALBERT G. DEAN.

BY John P. Tarbox
ATTORNEY.

Aug. 2, 1938.  E. J. W. RAGSDALE ET AL  2,125,691
SHEET METAL BEAM
Original Filed Nov. 22, 1933    2 Sheets-Sheet 2
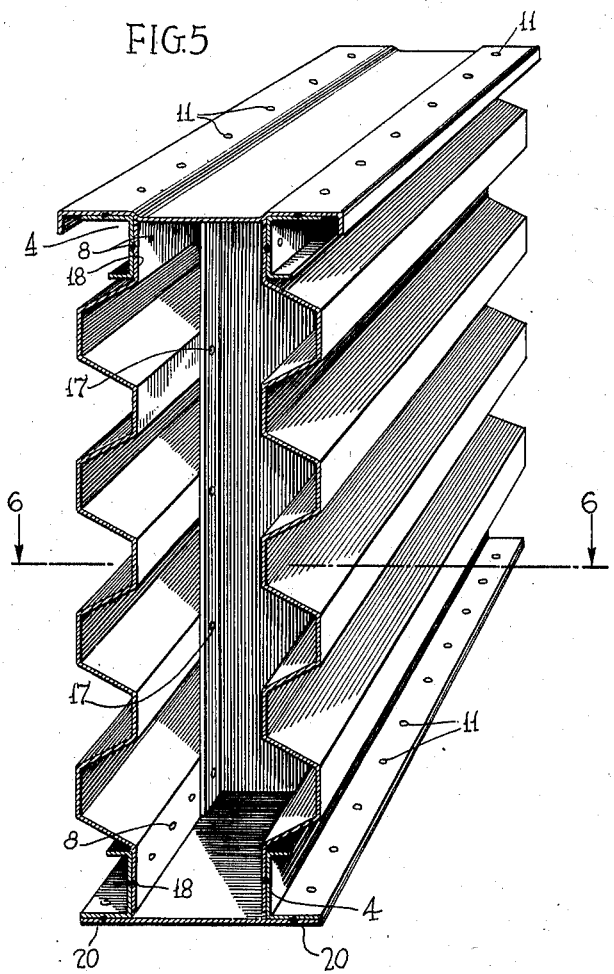
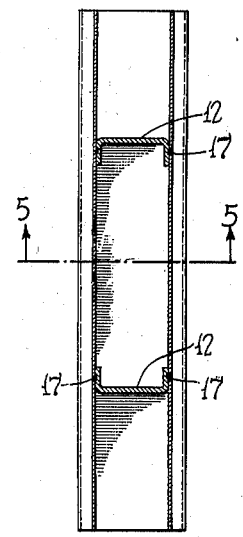
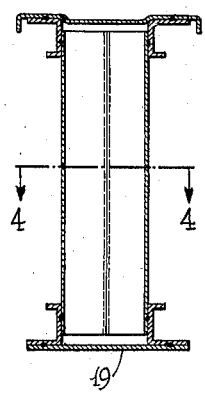
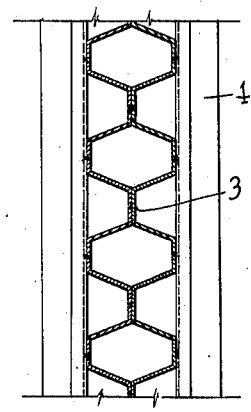
INVENTORS
Earl J. W. Ragsdale &
BY Albert G. Dean.
John P. Tarbox
ATTORNEY.

Patented Aug. 2, 1938

2,125,691

UNITED STATES PATENT OFFICE 2,125,691

SHEET METAL BEAM

Earl J. W. Ragsdale, Norristown, and Albert G. Dean, Narberth, Pa., assignors to Edward G. Budd Manufacturing Company, Philadelphia, Pa., a corporation of Pennsylvania Application November 22, 1933, Serial No. 699,102
Renewed April 24, 1936

8 Claims. (Cl. 189—37)

The present invention relates, in general, to beam structures and more specifically to a beam, girder or column fabricated of sheet metal.

The chief object of the invention is to provide a beam structure particularly amenable to fabrication from sheet stainless steel by spot welding and with maximum strength and rigidity and a minimum amount of material and labor, although the structure may be fabricated from material other than stainless steel, according to the intended use and restrictions in cost.

A further object is the provision of a structure of the above type capable of being spot welded with extreme simplicity of welding operations such as may be carried out by what is known as a "progressive welder" or automatic straight line spot welding machine, the simplicity of operation also minimizing the labor where hand operation is practiced.

These and other objects and advantages are attained by the provision of a construction utilizing structural elements capable of being pressed or rolled from strips of sheet metal, the different structural elements being given forms so co-operatively related to each other as to give maximum strength and rigidity with minimum amount of material, and to facilitate securing the parts together by substantially straight lines of spot welds located at points readily accessible without special tools.

Other objects and advantages of the invention will be more clearly understood upon reference to the following specification and the drawings accompanying the same.

In the drawings:

Fig. 3 is a transverse section of a modification.

Fig. 4 is a fragmentary sectional view taken on the line 4—4 of Fig. 3.

Fig. 5 is a perspective view, in transverse section, of a further modification taken on the line 5—5 of Fig. 6.

Fig. 6 is a horizontal section taken on the line 6—6 of Fig. 5.

Figure 1:
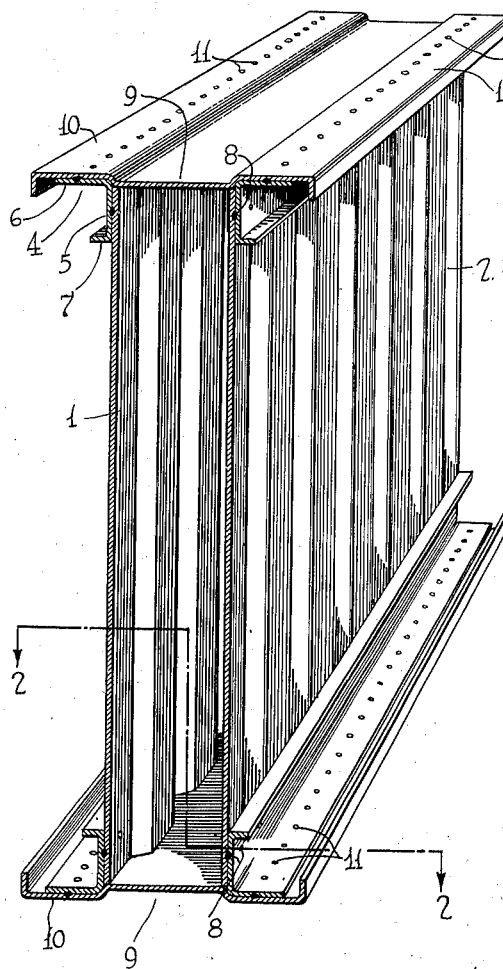
Fig. 1 is a perspective view in vertical transverse section taken on the line 1—1 of Fig. 2.
Figure 2:
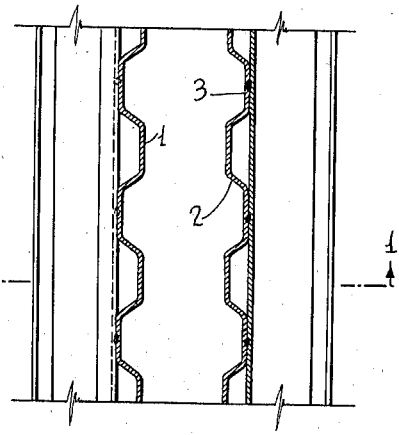
Fig. 2 is a fragmentary sectional view taken on the line 2—2 of Fig. 1.

Referring first to Figs. 1 and 2, the beam structure comprises a pair of transversely corrugated web members 1 and 2 pressed or rolled from strips of sheet material, in the present instance stainless steel, the corrugations being arranged preferably to form alternate oppositely projecting flat faced ribs 3. Side chord members 4 extend longitudinally of the beam along the outer faces of the ribs of the corrugated webs 1 and 2, near the edges of the webs. These side chord members are of rectangular channel section arranged with their back walls 5 against the flat outer surfaces of the web corrugations and their side walls 6 and 7 extending laterally of the beam, the outwardly disposed side walls 6 being relatively deeper than the inner walls 7. The side chord members 4 are spot welded to the outwardly projecting ribs of the web member 2 along a substantially straight line of spot welds 8.

Each chord member 4 is positioned so that its back wall extends slightly over the adjacent edge of the web member with the outer side wall 6 offset beyond the plane of the edge.

The side chord members 4 are connected by bridging chord members 9 of shallow channel section, having side flanges 10, each with an inwardly extending edge flange giving the side flange a reversely facing channel section. The bridging chord members 9 are fitted between the side chord members 4 across the edges of the web members 1 and 2 with the flanges 10 overlapping the side walls 6 of the chord members 4 and spot welded thereto by a substantially straight line of spot welds 11. The spot welds 11 extend along a line outside the plane of the adjacent corrugated web member 1 or 2, which permits the welds to be spaced apart at regular intervals independently of the spacing of the corrugations and allows the welding operation to be carried out with "a progressive welder", or any suitable automatic straight line welding machine.

While the spot welds 8 which secure the side chord members to the web, must be spaced with reference to the spacing of the ribs, the welding operation is rendered simple by the fact that the side chord members 4 may be welded in position on the web members before the two web members are brought together in the assembling of the beam.

It is to be noted that the beam is fabricated of three simple structural elements, the web members, side chord members, and bridging chord members, all of which are of such a shape as to be readily formed from strips of sheet material by rolling or pressing. It is also to be noted that the different shapes cooperate to give maximum strength and rigidity with minimum amount of material and permit the parts to be joined together by substantially straight lines of spot welds located at points accessible without special tools. The ability to form the structural elements by rolling or pressing from strips of sheet material is of paramount importance where the structure is to be made of high tensile stainless steel.

The modification shown in Figs. 3 and 4 is, in general, similar to that just described except that the corrugated web members are assembled in juxtaposition with oppositely facing ribs spot welded together as indicated at 13 in Fig. 4. In this form, to give proper thickness and rigidity to the web portion the corrugations of the web members are made deeper than those of Figs. 1 and 2, and are formed with their side walls 14 slanting.

The modification shown in Figs. 5 and 6 is similar to that of Figs. 1 and 2 except that the corrugations of the web members extend longitudinally of the beam, and that the web of the beam as formed by the two web members is reinforced by inter-web struts 12 of channel section, the struts being secured to the web members by spot welds 17 connecting the side walls of the channel section struts to the inwardly projecting ribs of the web members. In the present instance the side chord members 4 are spot welded not to the outer surface of the web member as a whole, but to the outer surface of the inwardly projecting rib or corrugation which forms the marginal edge 18 of the web. This structure has the advantage that both lines of spot welds 8 and 11 may be made in a substantially straight line and spaced at regular intervals independently of the form and dimensions of the structural elements.

In the modifications shown in Figs. 3 to 6, the lower bridging chord member 19 is of straight flat section instead of shallow channel section with flanges of reversely facing channel section as is the corresponding upper member. This simplified form of bridging chord member may be employed where the beam is to be used with one chord, say the lower chord, in tension. For similar reasons, this variations may be made also in the form of beam shown in Figs. 1 and 2. An advantage of this simplified form is that the extensions forming the flanges 20 may be varied to give various flange widths without the use of a multiplicity of forming dies or similar apparatus as would be the case with a member of specially shaped cross section.

While certain specific embodiments of the invention have been described herein for the purpose of disclosure, it is to be understood that the invention is not limited to such specific embodiments, but contemplates all such modifications and variations thereof as fall fairly within the scope of the appended claims.

What we claim is:

1. A beam comprising a pair of corrugated sheet metal webs, and chords each having outwardly facing channel section members having their bottoms lying along and secured to the outer face of each web near the edge of the web with a bridging member overlying the ends of the web corrugations and one side wall of the channel section members, and secured to the side walls of the channel members.

2. A beam comprising a pair of bodily spaced transversely corrugated sheet metal webs, a chord member lying along the outer face and near the edge of each web member and provided with an outwardly extending flange, and a bridging chord member overlying the ends of the corrugations and overlapping and secured to the outwardly extending flanges of the first mentioned chord member and spacing said corrugated webs apart, the width of the lap joint being greater than any other projection of the chord member, whereby the joint is freely accessible for line welding.

3. A light weight sheet metal beam comprising web members spaced apart throughout their bodies and transversely corrugated throughout their lengths, through running angular members connected with the outer faces of the corrugations by inner branches of their cross section, other branches being extended at an angle to the general plane of the web members whereby the bottoms of the corrugations are stabilized, said through running angular members having further branches, said further branches extending outwardly and through running chord members having margins overlapping and secured to the outwardly extending branches of the through running angular members and spacing said web members apart.

4. A light weight sheet metal beam comprising web members spaced apart throughout their bodies and transversely corrugated throughout their lengths, through running channel cross section members connected with the outer faces of the corrugations by the bottom branches of their cross section, other branches being extended at an angle to the general plane of the web members whereby the bottoms of the corrugations are stabilized, one of said branches being an outwardly extending attaching branch and through running chord members having margins overlapping and secured to the outwardly extending attaching branches of the through running angular members and spacing said web members apart, the outwardly projecting attaching branch of the through running chord member lying substantially in the plane of the ends of the web corrugations and being of a width substantially greater than the other outwardly projecting stabilizing branch of the channel section member whereby the lap joint is freely accessible for line welding.

5. A light weight sheet metal beam comprising web members spaced apart throughout their bodies and transversely corrugated throughout their lengths, through running channel cross section members connected with the outer faces of the corrugations by the bottom branch of their cross section, other branches being extended at an angle to the general plane of the web members whereby the bottoms of the corrugations are stabilized and through running chord members having margins overlapping and secured to one of the outwardly extending branches of the through running channel cross section members and spacing said web members apart, said attaching branch being substantially in the plane of the ends of the web corrugations and of a greater width than the other projecting branch whereby the lap joint is freely accessible for line welding.

6. A beam comprising a pair of longitudinally corrugated sheet metal webs, a bridging chord extending across adjacent edges of said webs, and including a through-running channel shaped member spacing said webs apart and having flanges extending beyond the webs, through-running side chord members of channel cross section having their bottoms secured to the edge of the web, and a side overlapping and secured to a flange of the through-running chord member, and a plurality of longitudinally spaced transversely extending channel shape members having their sides secured respectively to the inner faces of the corrugated webs, and with their bottoms transversely stiffening the webs substantially throughout their transverse extent.

7. A light weight sheet metal beam comprising web members transversely corrugated throughout their lengths, the depths of the corrugations being substantially one-half of the width of the beam between the webs, the corrugations being back-to-back and secured to each other in their abutting position, and separate through-running chord members having outwardly projecting margins, and through-running angular members having outwardly extending branches overlapping the outwardly projecting margins and secured thereto, the inner branches of the through running angular members being secured to the web corrugations and having stabilizing portions at an angle thereto, said stabilizing portions being substantially less in width than the outwardly extending branches whereby said lap joint is freely accessible for line welding.

8. A beam comprising a pair of sheet metal webs, and chords each having outwardly facing channel section members having their bottoms lying along and secured to the outer face of each web near the edge of the web with a bridging member overlying the ends of the webs and one side wall of the channel section members, and secured to the side walls of the channel members.

EARL J. W. RAGSDALE.
ALBERT G. DEAN.